United States Patent

Davidson et al.

[11] Patent Number: 5,902,654
[45] Date of Patent: May 11, 1999

[54] PROCESS FOR THE PACKAGED POLYMERIZATION OF OLEFINIC MONOMERS

[75] Inventors: Robert S. Davidson, Edina; Brook F. Duerr, Lake Elmo; Allen R. Siedle, Lake Elmo; Katherine A. Brown, Lake Elmo; Craig E. Hamer, Woodbury, all of Mich.

[73] Assignee: Minnesota Mining and Manufacturing Company, St. Paul, Minn.

[21] Appl. No.: 08/600,972

[22] PCT Filed: Sep. 8, 1995

[86] PCT No.: PCT/US95/11245

§ 371 Date: Feb. 23, 1996

§ 102(e) Date: Feb. 23, 1996

[87] PCT Pub. No.: WO96/07674

PCT Pub. Date: Mar. 14, 1996

[51] Int. Cl.[6] .................................................. B29D 22/00
[52] U.S. Cl. ......................... 428/35.1; 428/35.7; 525/240
[58] Field of Search .................. 428/35.1, 35.7; 525/240

[56] References Cited

U.S. PATENT DOCUMENTS

| | | | |
|---|---|---|---|
| 4,190,156 | 2/1980 | Adam | 206/447 |
| 4,250,063 | 2/1981 | Kotani et al. | 260/4 R |
| 4,810,523 | 3/1989 | Williams et al. | 427/36 |
| 4,923,936 | 5/1990 | Goodall et al. | 526/115 |
| 4,923,943 | 5/1990 | Hara et al. | 526/283 |
| 4,943,621 | 7/1990 | Janda et al. | 526/127 |
| 4,945,114 | 7/1990 | Franke et al. | 514/652 |
| 4,994,535 | 2/1991 | Endo et al. | 526/259 |
| 5,011,730 | 4/1991 | Tenney et al. | 428/209 |
| 5,109,892 | 5/1992 | Somers | 141/11 |
| 5,257,491 | 11/1993 | Rouyer et al. | 53/428 |
| 5,296,433 | 3/1994 | Siedle et al. | 502/117 |
| 5,296,566 | 3/1994 | Brown-Wensley et al. | 526/171 |
| 5,333,439 | 8/1994 | Bozich et al. | 53/450 |
| 5,373,682 | 12/1994 | Hatfield | 53/440 |

FOREIGN PATENT DOCUMENTS

| | | |
|---|---|---|
| 78-28035 | of 1977 | European Pat. Off. . |
| 83-23647 | of 1982 | European Pat. Off. . |
| 88-364061 | of 1987 | European Pat. Off. . |
| 92-290498 | of 1991 | European Pat. Off. . |
| 1 174 825 | of 1993 | France . |
| 1 694 837 | 7/1971 | Germany . |
| 36 25 358 | 6/1989 | Germany . |
| 63-273601 | 11/1988 | Japan .................. C08F 2/48 |
| WO 93/23224 | 11/1993 | WIPO . |
| WO 95/29770 | of 1994 | WIPO . |

OTHER PUBLICATIONS

D.A. Armitage, "Organosilanes", *Comprehensive Organometallic Chemistry*, vol. 2, pp. 117–120, Pergamon Press, Oxford (1992).

King et al., "Polyolefin Adhesives" (1969) CA# 73:36123 (abstract only).

*Primary Examiner*—Cecilia J. Tsang
*Assistant Examiner*—Patrick R. Delaney

[57] ABSTRACT

A process that involves the packaged polymerization of olefinic monomer(s) and catalyst systems comprising a transition metal species that mediates the polymerization of the monomer(s) is disclosed. This process provides a way to use the resultant polymer without extensive further processing.

21 Claims, No Drawings

PROCESS FOR THE PACKAGED POLYMERIZATION OF OLEFINIC MONOMERS

This application is a 371 of PCT/US95/11245, filed Sep. 8, 1995.

BACKGROUND OF THE INVENTION

1. Field of the Invention

The present invention relates to a process for the polymerization of mixtures comprising olefinic monomers, the polymerization of each monomer being mediated by a transition metal-containing species.

2. Description of Related Art

Non-free radical polymerizations of ethylenically unsaturated monomers are well known. These polymerizations typically use catalysts instead of initiators to effect polymerization. Examples of such polymerizations include Ziegler-Natta (ZN) polymerizations, ring-opening metathesis polymerizations (ROMP), and group transfer polymerizations. Catalysts for these polymerizations can be quite susceptible to deactivation by adventitious oxygen and water, requiring that such deactivating materials be rigorously excluded from all reagents as well as the reaction vessel.

Specifically, ZN (co)polymerizations of monoolefins, particularly α-olefins, are well known in the art. Typically, extreme care is taken to exclude both oxygen and water from these polymerizations. Likewise, ROMP (co)polymers are known in the art. Examples of ROMP processes in both inert conditions and in the presence of water, oxygen, or both are known.

Methods of producing hot melt adhesives in sealed reaction vessels are known. U.S. Pat. No. 4,810,523 describes a method for producing hot melt adhesives in which a polymerizable liquid monomer composition is introduced into a sealed reaction vessel and polymerized by ionizing radiation. The adhesive is then removed from the reaction vessel before hot melt application. The reaction can be performed in a lined cylindrical pressure vessel or a multilayer bag.

Methods of packaging pre-made hot melt adhesives and the resulting packaged adhesives are known. German Patent No. 36 25 358 describes a hot melt adhesive block in a thermoplastic film. The film is melted and mixed with the adhesive in an extrusion process.

U.S. Pat. No. 5,257,491 describes a method of packaging a thermoplastic or thermosetting hot melt adhesive in which a portion of an adhesive composition is surrounded with a plastic packaging material. The plastic packaging material does not substantially adversely affect the adhesive characteristics of a molten mixture of the adhesive and the plastic packaging material.

PCT International Publication No. WO 93/23224 describes a method for packaging hot melt adhesive compositions in which molten hot melt adhesive (made outside the package) is poured into a mold lined with a plastic film. The plastic film is meltable with the adhesive composition and blendable into the molten adhesive composition.

A method for producing thermoplastic mold materials useful for producing molded articles is described in German Patent Disclosure 1 694 837. In the described method, the polymerization material is allowed to polymerize in a hollow profile that functions as a polymerization vessel. The hollow profile may be made of the same polymer produced in the polymerization process.

SUMMARY OF THE INVENTION

Briefly, the present invention provides a method of making a packaged poly(olefin) comprising the steps:

a) substantially completely surrounding with a packaging material a mixture comprising
  (1) at least one olefinic monomer, having 5 to 30 carbon atoms, having one of the formulae

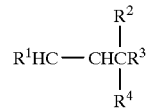

or

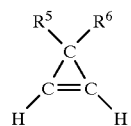

or

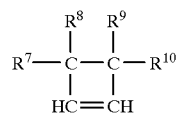

wherein (A) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or (B) $R^1$, and at least one of $R^2$, $R^3$, and $R^4$, as well as the carbon atoms to which they are attached, form at least one strained aliphatic ring;

$R^5$, $R^6$, $R^7$, $R^8$, $R^9$, and $R^{10}$ are independently selected from the same group as are $R^2$ through $R^4$, with the provisos that
  (1) $R^5$ and $R^6$ cannot both be hydrogen, and
  (2) $R^7$, $R^8$, $R^9$, and $R^{10}$ cannot all be hydrogen; and (2) an effective amount of a catalyst system comprising a transition metal-containing species; and b) allowing the monomer(s) to polymerize to a poly(olefin), the packaging material providing an environment that is inert toward the catalyst system and being such that, when a hot melt-coated blend of the packaging material and the poly(olefin) is prepared, that coating functions substantially the same as or better than a hot melt coating of the poly(olefin) for the same end use application.

The process described above involves olefinic monomers whose polymerizations are mediated by a transition metal-containing species. The term "mediated by" means that the transition metal-containing species plays an integral role in the polymerization of the olefinic monomer(s). Common olefinic monomers that polymerize in this manner include α-olefins and ring-strained non-conjugated cyclic olefins. The term "α-olefin" means a compound of the formula $H_2C=CHCR^2R^3R^4$ wherein $R^2$, $R^3$, and $R^4$ are independently hydrogen or a $C_1$–$C_{27}$ aryl, aralkyl, aliphatic, or cycloaliphatic group which can optionally contain one or more heteroatoms. Of course, as one skilled in the art will recognize, any substituent of the α-olefin must not deactivate the transition metal-containing catalyst system.

Ring-strained non-conjugated cyclic olefin monomers undergo a ring

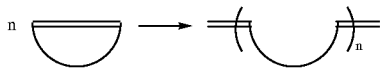

opening metathesis polymerization (ROMP) that can be summarized as follows: wherein

is a ring-strained non-conjugated cyclic olefin monomer and

illustrates the structure of the resultant ring-opened polymerized unit with n being from 5 to 100,000.

Common catalyst systems in which a transition metal-containing species plays an integral role in the polymerization of one or more olefinic monomers include ZN catalyst systems, metallocene systems, as well as inorganic compounds and organometallic complexes that comprise a metal from Periodic Groups 4 to 10 (new IUPAC version). Those skilled in the art will readily recognize which catalyst system(s) is/are useful with a given olefin or olefin combination.

The packaged process of the present invention has several advantages over traditional polymerization processes including an increased ability to control the evolution of heat (and thus the molecular weight of the resultant polymer), a reduction in the number of processing steps, a consumable reaction vessel, and ease in handling. The package of this process can take many forms as detailed below.

Properties of the poly(olefin) materials produced by the process of the present invention vary depending on the monomer(s) and/or catalysts used but are comparable to or better than those of poly(olefin) materials produced by conventional techniques. Commonly, however, these poly(olefins) are used as pressure-sensitive adhesives (PSAs), release (i.e., low adhesion) materials, and vibration damping materials.

Unless otherwise indicated, the following definitions apply throughout this document:

"substantial exclusion" with respect to species that can deactivate a given catalyst system, means that the packaging material in question provides, over a time period of interest, a barrier to the deactivating species such that the amount of the species is kept sufficiently low in the package (taken as a whole) so as to maintain a catalyst concentration that can effect a polymerization that yields a polyolefin having a molecular weight that provides useful properties; and "inert" means the type of environment that allows a sufficient concentration of a catalyst system to be maintained, over a time period of interest, that can effect a polymerization that yields a polyolefin having a molecular weight that provides useful properties.

The above definitions are not meant to require that the packaging material provide an absolute, impenetrable barrier to species that can deactivate a given catalyst system. Rather, they are meant to indicate that the packaging material can include those materials through which such species can penetrate with the proviso that the amount of deactivating species able to penetrate (during the period of interest) is not high enough to diffuse through the mixture and deactivate all or most of the catalyst system. The skilled artisan will recognize that a variety of materials with a range of barrier properties can be used as long as the concentration of catalyst is adjusted accordingly (bearing in mind the implications toward long-term stability where a very high concentration is used) or the polymerization time frame is kept sufficiently short.

In addition to "exterior" deactivating species (i.e., those outside the package such as, for example, ambient oxygen or water vapor), the packaging material itself can possibly contain stabilizers or other adjuvants that can deactivate the catalyst system if leached into the packaged material. The amount of these "interior" deactivating species also needs to be kept sufficiently low so that the catalyst system is not totally or substantially deactivated.

DETAILED DESCRIPTION OF PREFERRED EMBODIMENTS

The process of the present invention involves the use of one or more olefin monomers, having 30 or fewer carbon atoms, of the general formula

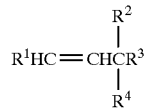

wherein (a) $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or (b) $R^1$ and one of $R^2$, $R^3$, and $R^4$, as well as the carbon atoms to which they are attached, form at least one strained aliphatic ring;

or of the general formula

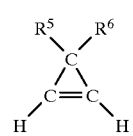

wherein $R^5$ and $R^6$ are selected from the same group as are $R^2$ through $R^4$, with the proviso that both of $R^5$ and $R^6$ cannot be H;

or of the general formula

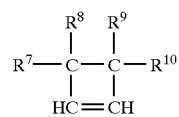

wherein $R^7$, $R^8$, $R^9$, and $R^{10}$ are independently selected from the same group as are $R^2$ through $R^4$, with the proviso that $R^7$, $R^8$, $R^9$, and $R^{10}$ cannot all be H.

Such olefinic monomers include α-olefins and ring-strained non-conjugated cyclic olefins. Those skilled in the art will recognize which monomers or combination thereof provide a desired property for a given end use application.

The process of the present invention involves the use of a monomer or mixture of monomers that is at least somewhat fluid or flowable at a temperature between about 15° and about 150° C., preferably between about 20° and 125° C., more preferably between about 20° and 100° C., most preferably between about 20° and 70° C. Where a solid monomer is to be included, it must be sufficiently soluble in the other liquids, preferably the other monomer(s), so as to form a flowable, substantially homogeneous reaction mixture that can be easily introduced into a package. Alternatively, one or more solid monomers and an appropriate catalyst system can be substantially completely surrounded by packaging material and then heated. In such a system, when the temperature reaches the point where the monomer(s) softens or melts, polymerization begins. Such a system can allow for significant ease in handling as well as elimination of solvents.

Where the monomer(s) comprise one or more α-olefins, at least one of the monomers will normally be a $C_5$–$C_{30}$ α-olefin. When polymers demonstrating adhesive properties are desired, the α-olefin is preferably a $C_6$–$C_{12}$ α-olefin, and where polymers demonstrating abhesive properties (i.e., release properties) are desired, the α-olefin is preferably a $C_{12}$–$C_{20}$ α-olefin. Such an olefin can either be straight chain or branched (i.e., comprising one or more side chains). Common examples include 1-pentene, 1-hexene, 1-heptene, 1-octene, 1-nonene, 1-decene, 1-undecene, 1-dodecene, 1-hexadecene, 1-octadecene, 4-methyl-1-pentene, allyltrimethylsilane, and allylbenzene. These monomers can optionally be substituted with conventional substituents (i.e., those that do not interfere with the polymerization of, or the desired properties of the polymer produced from, these monomers). Blends of these monomers or one or more of these monomers plus a lower (i.e., $C_2$–$C_4$) 1-alkene are also within the scope of the present invention.

Ring-strained non-conjugated cyclic olefins useful in the present invention include monocyclic mono- and polyolefins and polycyclic mono- and polyolefins such as those described in U.S. Pat. No. 5,296,566. These cyclic olefins can be substituted with up to four saturated or unsaturated hydrocarbyl, alkaryl, aralkyl or aryl groups, in which "alkyl" or "alk" or "hydrocarbyl" can be linear, branched, or cyclic, each group containing up to 30 carbon atoms, up to sixty halogen atoms, and up to 60 heteroatoms selected from non-peroxidic O, N, and Si, which can be combined to form functional groups or linkages includingtethers, alcohols, alkoxides, ketones, aldehydes, carboxylic acids, esters, amides, imides, amines, cyanides, anhydrides, organosilicons, organosilicones, oxysilanes, alkoxysilanes, and the like.

Preferred monocyclic monoolefins include substituted and unsubstituted cyclopropene, cyclobutene, cyclopentene, cycloheptene and cyclooctene. Preferred polycyclic monoolefins include substituted and unsubstituted norbornene and bicyclo[2.2.2]-oct-2-ene. Preferred polycyclic polyolefins include substituted and unsubstituted norbornadiene and dicyclopentadiene. In the cases of substituted norbornene and dicyclopentadiene, endo/exo, syn/anti, or combinations of any of these isomers are suitable. Potentially useful monomers include 5-methyl-2-norbornene, 5-ethyl-2-norbornene, 5-butyl-2-norbornene, 5-hexyl-2-norbornene, 5-octyl-2-norbornene, 7-methyl-2-norbornene, 1-methyl-2-norbornene, 5,6-dimethyl-2-norbornene, 5-norbornene-2-carbonitrile, 5-norbornene-2-carboxaldehyde, 5-norbornene-2,3-dicarboxylic acid, diethyl 5-norbornene-2,3-dicarboxylate, dimethyl 5-norbornene-2,3-dicarboxylate, 5-norbornene-2,3-dicarboxylic anhydride, 5-norbornene-2,2-dimethanol, 5-norbornene-2-methanol-5-norbornen-2-ol, 2-acetyl-5-norbornene, 5-norbornen-2-yl acetate, 2-benzoyl-5-norbornene, 5-vinyl-2-norbornene, 5-methylene-2-norbornene, 5-norbornene-2-methanol acrylate, 5-[2-(trimethyl-silyl)ethyl]-2-norbornene, 5-[2-(pentamethyldisiloxyl)ethyl]-2-norbornene, 5-chloromethyl-2-norbornene, 2,3-di(chloromethyl)-5-norbornene, 5-trifluoromethyl-2-norbornene, and 2,3,3-trifluoro-2-trifluoromethyl-5-norbornene. Other suitable monomers are described in U.S. Pat. Nos. 5,011,730, 4,994, 535, 4,945,144, 4,943,621, 4,923,943, 4,923,936, and 4,250, 063. All these materials are commercially available (e.g., Aldrich Chemical Co.; Milwaukee, Wis.) or can be prepared as described in the chemical literature. For example 5-[2-(trimethylsilyl)ethyl]-2-norbornene and 5-[2-(pentamethyldisiloxy)ethyl]-2-norbornene which are prepared by the reaction of 5-vinyl-2-norbornene with trimethylsilane or pentamethyldisiloxane, respectively, in the presence of platinum-containing catalysts using published procedures for the hydrosilation of alkenes (see D. A. Armitage, "Organosilanes," *Comprehensive Organometallic Chemistry*, vol. 2, 117–20, Pergamon Press, Oxford (1982)). Preferably, at least one of the cyclic olefins of the present invention is polycyclic, more preferably substituted norbornene or substituted or unsubstituted dicyclopentadiene.

Catalysts that can be used in the process of the present invention include those systems that comprise a transition metal-containing species. Where at least one of the olefinic monomers is an α-olefin, useful catalysts include metallocenes and ZN systems. A "ZN system" is a combination of a transition metal compound (commonly a halide), preferably a metal from Periodic Groups 4 or 5, with an alkyl, aryl, or hydride derivative of a non-transition metal such as aluminum in an inert solvent or diluent and under inert conditions. Among the most preferred ZN systems is $TiCl_3$ (optionally supported on an inert material such as $MgCl_2$ or polypropylene) combined with an aluminum alkyl such as $Al(C_2H_5)_3$. Such a system can be introduced as, for example, a slurry or suspension in an inert solvent such as toluene or heptane. Those skilled in the art will readily recognize other useful ZN systems.

With respect to metallocene systems, particularly useful metal containing compounds include those that comprise Ti, Zr, Hf, or V. An example of such a system is $(C_{13}H_9)Zr(CH_3)_2$ combined with either $C_{18}H_{37}OH.B(C_6F_5)_3$ or methylaluminoxane. Further explanation of such hydrocarbylcyclopentadienyl metal complex—tris (pentafluorophenyl)borane complex systems can be found at, for example, U.S. Pat. No. 5,296,433. Metallocene catalyst systems commonly are added to the monomer(s) as solution(s) in an aromatic solvent such as toluene or xylene.

Where at least one of the olefinic monomers is a ring-strained non-conjugated cyclic olefin, useful catalysts include Periodic Groups 4–10 transition metal compounds and complexes, particularly those that comprise at least one of Mo, W, Ru, Os, Ti, Re, and Ir. Although heterogeneous catalysts can be used, homogeneous ones are preferred. Cocatalysts can be used in combination with certain transition metal-containing species. Traditional cocatalysts include compounds having one or more alkyl groups bonded to a non-transition metal (i.e., those from Periodic Groups 1–2 and 12–14), although some recently developed catalysts include Lewis acids, oxidizing agents, silanes, heteroatom-containing olefins, and alkynes. Although well known air- and water-sensitive catalysts can be used, those that are air- and moisture-stable are preferred. One- and two-part catalysts that are air and moisture stable are more fully described in the Background, Summary, and Detailed Description sections of the previously mentioned U.S. Pat. No. 5,296, 566.

As those skilled in the art will recognize from this discussion, the process of the present invention is not limited by a particular catalyst or catalyst system. The identity of the catalyst is unimportant as long as it effects the polymerization of the monomer(s) to produce a polymer having desired end-use properties.

Many of the above-described catalysts are sensitive to a variety of substances including, particularly, water and oxygen. For example, ZN and some metallocene systems are very sensitive to both water and oxygen. When such catalyst systems are used, the process of the present invention provides for the substantial exclusion of the catalyst-quenching materials. The particulars of how this exclusion is accomplished are more fully detailed in the description of the process below.

Those skilled in the art will also recognize that keeping the concentration of catalyst as low as possible is desirable so as not to degrade the performance characteristics of the resultant polymer. Effective concentrations will vary depending on the particular catalyst system used, and those skilled in the art will recognize useful concentrations for a given polymerization.

Where the monomer is one or more ring-strained non-conjugated cyclic olefins arid the catalyst used is not sensitive to, for example, active hydrogen-containing compounds, an antioxidant or other stabilizer can be included in the polymerizable mixture. Antioxidants and stabilizers are useful in inhibiting degradation of the resultant polymers. Adding antioxidant to the polymerizable mixture eliminates the need for an additional processing step in which antioxidant is subsequently added to the polymer. Useful antioxidants include, but are not limited to, hindered phenols, hindered amines, and triazines. Where such an antioxidant is used, it preferably makes up 0.01 to 5% (by weight) of the mixture.

The process of the present invention can be performed in an essentially solvent-free manner. Some solvent, such as that used to introduce the catalyst into the mixture (e.g., a solution, slurry, or suspension) might be present. The amount of unreactive volatiles in a given package is preferably less than 20% (by wt.), more preferably less than 10% (by wt.). Costly and complicated post-polymerization processing steps can be avoided by eliminating or substantially reducing the amount of solvent used.

The above advantage should not be considered limiting, however. If the presence of solvent were deemed to be advantageous for a given polymerization, the process of the present invention allows for the presence of such a solvent. For example, some common solvents retard rates of polymerization in certain systems. By controlling the amount of such a solvent used in a package of the present invention, the rate of polymerization of the monomer mixture in that package can also be controlled. Some solvent within a package might also aid in the dissipation of heat generated by an exothermic polymerization.

Other adjuvants can be present in the mixtures that undergo the process of the present invention. Common adjuvants that can be used include, but are not limited to, plasticizers, tackifiers, oils, polyenes, oligomers and/or polymers (including rubber and elastomers), viscosifiers, chain transfer agents, and fillers. Regardless of type or identity, any adjuvant used must not deactivate the transition metal-containing catalyst system. For example, where a ZN system is used to catalyze an α-olefin polymerization, the presence of an adjuvant that contains an active hydrogen atom would be counterproductive.

The method of the present invention makes the handling and mixing of such adjuvants extremely convenient. Specifically, such adjuvants are mixed with the monomer(s) or the polymerizing mixture. This is in direct contrast to conventional polymerization and coating techniques, which require that the adjuvant be added to a polymer with a high viscosity.

In the method of making a packaged poly(olefin) of the present invention, a polymerizing or polymerizable mixture (i.e., one or more monomers, a catalyst system containing a transition metal species that mediates the polymerization of the monomer(s), and optional adjuvants or coreactive species) is substantially completely surrounded by packaging material. If desired, the monomer(s) can be partially polymerized by any conventional means (e.g., in a batch reactor) to a mixture that can be easily surrounded by the packaging material.

The amount of polymerizing mixture in a given package will depend on the size and shape of that package. Typically, packaging material will comprise from about 0.5 to 20%, preferably from about 0.75 to 15%, and most preferably from about 1 to 5 %, of the total weight of the packaging material and the mixture. After polymerization, at least 20%, preferably at least 50%, more preferably at least 75%, and most preferably at least 90% of the olefin monomer(s) has/have been converted to poly(olefin). Preferably, the poly(olefin) has a molecular weight (MW) that makes the polymer desirable for particular end-use applications. High MW polymers are generally preferred.

Where an adjuvant (e.g., a tackifier) is included with the polymerizing mixture, a small amount of a solvent can prove to be advantageous. Such a solvent preferably makes up no more than 10% (by wt.), more preferably no more than 5% (by wt.), of the mixture.

Many different packaging materials can be used in the process of the present invention. The only limitation on this material is that, when a hot melt-coated blend of the resultant poly(olefin) and the packaging material is prepared, that coating of the blend has substantially the same properties as, or better properties than, a hot melt coating of the poly (olefin) intended for the same end-use application. Preferably, the packaging material comprises a polymer made from one or more components of the poly(olefin) or comprises a polymer that is physically and chemically compatible with the poly(olefin) upon melting. Preferred packaging materials include flexible thermoplastic polymeric films, especially those with melting points of 170° C. or less. The thermoplastic polymeric film preferably has a thickness of about 0.01 to 0.25 mm, more preferably from about 0.025 to about 0.125 mm. Useful thermoplastics include homo- and copolymers of propylene and ethylene as well as polyesters and polyester copolymers.

As mentioned above, the packaging material substantially completely surrounds the polymerizing mixture. A variety of embodiments are possible. The simplest of these is one in which the packaging material completely surrounds the mixture (i.e., a sealed pouch). This pouch can optionally incorporate a rupturable or removable divider. In such an arrangement, the polymerizing mixture is not formed until the continuity of the divider is interrupted. In another variation, monomer(s) is/are packaged in such a way that the catalyst system can be injected into the monomer(s), e.g., through a septum. In yet another variation, two substantially parallel sheets of the packaging material enclose a layer, preferably a thin layer, of monomer mixture. Although the edges of the package are not sealed in this embodiment, the small discontinuity in the package wall has been found to not provide a sufficiently large aperture to allow entry into the packaged material of enough of a given catalyst-deactivating chemical species to halt or substantially hinder polymerization. Another possible arrangement is a sausage-like construction (i.e., an elongated tube preferably having a ratio of length to square root of cross-sectional area of at least 30 to 1 and having one end sealed prior to filling and the other end sealed after filling). Such an arrangement can produce fibers or rods of poly(olefin).

Many potentially useful catalyst systems are sensitive to one or more catalyst-destroying chemical species. The packaging material must provide an environment that is inert toward such a catalyst system. For example, ZN catalyst systems are notoriously sensitive to oxygen and water. Where a ZN catalyst system is used in this process, the packaging material must substantially exclude oxygen and water.

Conversely, many catalysts for ring-strained non-conjugated cyclic olefins are not water and oxygen sensitive; therefore, oxygen and water need not be excluded by the packaging material in such a situation. In some embodiments, an oxygen permeable packaging material might actually be preferred.

A packaged construction (i.e., polymerizing mixture in packaging material) can be contacted with a heat exchange medium (i.e., thermal buffer) while the monomer(s) is/are polymerizing so as to moderate polymerization conditions. Useful heat exchange media include moving air, water, ethylene glycol, propylene glycol, and various perfluorinated solvents, although water is preferred due to its high heat exchange capacity, easy availability, and cost. While a polymerization can be performed in static contact with a heat exchange is medium, transporting the packaged material through such a medium is preferred. Preferably, the packaged construction is allowed to remain in a heat exchange medium for a time sufficient to effect substantial polymerization of the monomer(s) while controlling the reaction exotherm to maintain a reaction temperature within 20° C. of the temperature of the medium. Preferably, the thermal buffer has a heat transfer coefficient of at least 25 $W/(m^2 \cdot K)$, more preferably at least about 100 $W/(m^2 \cdot K)$, and most preferably at least about 500 $W/(m^2 \cdot K)$. Preferably, the polymerization is allowed to process for a period of time sufficient to effect from about 5 to about 100% conversion, more preferably at least about 20% conversion, of the monomer(s) to polymer. More information on this thermal control of polymerization can be found in PCT application US95/03467 and U.S. Pat. No. 5,741,542, both of which claim priority from U.S. patent application Ser. No. 08/234,468 now abandoned.

In forming the packaging material, two lengths of thermoplastic film can be heat sealed together across the bottom and on each lateral edge on a liquid form-fill-seal machine to form an open ended pouch. The monomer mixture is introduced into the packaging material which is then heat sealed to completely surround the polymerizing mixture. The form-fill-seal machine optionally can be equipped with an impulse sealer to form a seal across the pouches to form top and bottom seals. Such a sealer can have one or two sets of jaws that clamp the pouch shut before sealing. The sealing wire can then be heated to effect the seal and the seal cooled before the jaws are released. The sealing temperature is generally above the softening point and below the melting point of the film used to form the pouch. Removal of at least most of the air from the pouch before sealing, especially where the catalyst is oxygen or moisture sensitive, is preferred. For ease of handling, sealing the package as soon as it is filled with the monomer mixture is desirable, although immediate sealing is not always necessary.

Alternatively, a single length of film can be folded lengthwise and sealed on two edges, filled with the monomer mixture, and the remaining open edge sealed. In another enmbodiment, a single length of film can be pulled through a forming collar, sealed to form a tube, filled with the composition, and sealed. This alternative can be carried out on a commercially available liquid form-fill-seal machine.

Seals can be effected in any of a number of different configurations to form multiple pouches across and down the lengths of film. For example, in addition to the seals on the lateral edges, a seal can also be formed down the center of the lengths of film so that a cross seal will form two filled packages. The packages can be left attached to each other by the cross-seals or cut into individual pouches.

The monomer mixture can be continually introduced into a hollow profile of a polymeric film material and continuously polymerized to provide a poly(olefin). The polymeric film material with the enclosed monomer mixture can be continuously introduced into a vessel in which the polymeric film material and the contents are melted. Such a packaging material forms a containment means that has a cross-sectional area of from about 0.5 $cm^2$ to about 25 $cm^2$, more preferably from about 1 $cm^2$ to about 10 $cm^2$. This type of package need not have cross seals.

The monomer mixture can also be coated onto a carrier web, covered with a sheet material, and polymerized. In this embodiment, the carrier web, the sheet material, or preferably both, are hot melt coatable with the poly(olefin) derived from the monomer mixture. If both the carrier web and the sheet material are hot melt coatable, the resulting composite can be fed directly into a hot melt coater, or cut into smaller strips or pieces and fed to the hot melt coater. If only one of the carrier web or the sheet material is compatible with the poly(olefin), the non-compatible entity can be removed before the mixture is hot melt coated. To facilitate handling after the non-compatible entity is removed, the coated mixture can be folded over onto itself so that the compatible entity substantially surrounds the major surfaces of the coated adhesive. The folded, poly(olefin)-coated web can then be fed into a hot melt coater or cut to smaller strips or pieces before hot melt coating.

Poly(olefins) made according to any of these packaged processes are useful as, for example, PSAs, transfer adhesives, structural adhesives, vibration damping materials, release materials, and protective coatings. Once the mixture-packaging material hot melt coating has been prepared, it can be coated onto a substrate to form a pressure-sensitive adhesive, release material, etc. Where the poly(olefin) is to be hot melt coated, the substrate can be the surface of a part to be bonded to another part.

Once a poly(olefin) has been prepared within the packaging material, it can be used to make a thermoplastic or thermosettable hot melt adhesive by introducing the poly (olefin) and packaging material (and any optional adjuvants) into a vessel in which the package and the poly(olefin) are softened or melted. However, the packaged poly(olefin) preferably is hot melt coated by processing a filled package in a hot melt coater or extruder at a temperature sufficient to melt the packaging and the poly(olefin) and with sufficient mixing to form a substantially homogeneous coatable mixture (i.e., one that can be coated onto a substrate). By "substantially homogeneous" is meant a mixture that has no macroscopic segmented domains, although small phase-segmented domains can be present. The hot melt mixture can be used to form a PSA tape by coating the melted mixture onto a sheet material. The sheet material can be, among other things, a tape backing or a release liner.

The various operations from the previous paragraph can be done in a continuous process. In other words, the monomer mixture can be sequentially surrounded by the packaging material, polymerized, hot melt coated to form a tape, and optionally crosslinked. The steps can also be performed individually at separate times and sites. For example, the packaged monomer mixture can be polymerized at one time and then extruded and crosslinked at another time. Alternatively, it can be fully or partially polymerized and then removed from the package and further processed.

As mentioned above, an adhesive tape can be made by extruding the melted mixture onto a backing. Typical tape backings include cellulosic materials such as paper, creped paper, and cloth; films such as biaxially oriented polyester or biaxially and monoaxially oriented polypropylene; nylon; and metal foils such as aluminum foil. The back side of the backings can be treated with a release coating such as silicone. Backings can be treated prior to hot melt coating to enhance the adhesion of the adhesive thereto.

Also as mentioned above, a transfer tape can be formed wherein the substrate is a release liner. The release liner can be coated on one or both sides with a release coating so that the transfer tape can be removed from the substrate when used by the end user.

Objects and advantages of this invention are further illustrated by the following examples. The particular materials and amounts thereof, as well as other conditions and details, recited in these examples should not be used to unduly limit this invention.

EXAMPLES

Example 1

A polyethylene bag sized to hold the reaction components and made from 0.1 mm (4 mil) thick polyethylene film (Anchor Paper Co.; St. Paul, Minn.) was charged with 150 mL 1-octene (Aldrich Chem. Co.) and 0.5 mL 1M triethylaluminum solution in hexane (Ethyl Corp.; Baton Rouge, La.) in a dry box under a nitrogen atmosphere. The contents were briefly mixed before 50 mg $TiCl_3$ (AKZO, Inc.; Weston, Mich.) was added as a dry powder to the reaction mixture. The bag was sealed, removed from the dry box, and placed in a water bath maintained at 23° C. for approximately 24 hours. Residual monomer and solvent were removed from the polymerized mass by vacuum drying to produce 74.5 g (69% conversion) of poly(1-octene).

Example 2

The procedure of Example 1 was followed to polymerize 1-octene in a bag, except that the $TiCl_3$ catalyst was added to the reaction mixture as a slurry of $TiCl_3$ on a polypropylene support in hexane (i.e., 20 mL of suspension of LYNX™ 900 catalyst containing 38.3 mg $TiCl_3$ (Catalyst Resources, Inc.; Houston, Tex.)). The bag was sealed, removed from the dry box, and left in a water bath maintained at 23° C. for approximately 24 hours. Residual monomer and solvent were removed from the polymerized mass by vacuum drying to produce 80 g (74.6% conversion) of poly(1-octene).

Example 3

The procedure of Example 1 was followed to polymerize 1-octene in a bag, except that the $TiCl_3$ catalyst was added to the reaction mixture as a dry powder on a magnesium dichloride support (20 mg of LYNX™ 1000 catalyst containing 0.5 mg $TiCl_3$). The bag was sealed, removed from the dry box and left in a water bath maintained at 23° C. for approximately 24 hours. Residual monomer and solvent were removed from the polymerized mass by vacuum drying to produce 50 g (46.6% conversion) of poly(1-octene).

Example 4

In a dry nitrogen atomsphere, a mixture of 55.0 g 5-hexyl-2-norbornene (prepared as described in U.S. Pat. No. 3,546,183) containing no crosslinker, 15 mg $[Ir(cyclooctene)_2Cl]_2$ (Aldrich Chem. Co.) and 0.27 g Irganox™ 1010 antioxidant (Ciba-Giegy Corp.; Hawthorne, N.Y.) in 3 mL $CH_2Cl_2$ was placed in a polyethylene bag having a 0.10 mm (4 mil) wall thickness. The bag was removed from the inert atmosphere and opened to air. Thereafter, 130 mg $Li[N(SO_2CF_3)_2]$, available as HQ 115 from 3M (St. Paul, Minn.), in 2 mL ethanol was added with stirring. The viscosity of the reaction mixture began to increase rapidly. After approximately 15 hours at ambient temperature, the bag contained a polymer having a $M_n$ of $6.70 \times 10^4$, a $M_w$ of $3.00 \times 10^5$, and a residual monomer content of about 50%.

This example demonstrates the polymerization of a ring-strained cyclic olefin in a bag.

Example 5

To a stirred slurry of 4.46 g zinc carbonate in 50 g deionized water was slowly added 20.0 g distilled $H[N(SO_2CF_3)_2]$, which was prepared by adding $Li[N(SO_2CF_3)_2]$ to 96% analytical reagent-grade sulfuric acid, followed by distillation at reduced pressure. The final pH was 7–8. The mixture was filtered to remove any unreacted zinc carbonate and the clear filtrate was concentrated to yield a white crystalline salt, $Zn[N(SO_2CF_3)_2]_2$.

A mixture of 16.834 g 5-hexyl-2-norbornene (prepared as described in U.S. Pat. No. 3,546,183), 5.538 g Regalrez™ 1126 $C_5$ resin tackifier (Hercules Chemical Co.; Wilmington, Del.), and 7.399 g Indopol™ H1900 polybutene tackifier (Amoco Chemical Co.; Chicago, Ill.) was prepared and then briefly heated so as to dissolve the resin tackifier. The mixture was then cooled to ambient temperature.

Separately, a catalyst mixture of 36 mg $[Ir(cyclooctene)_2Cl]_2$, 58 mg $Zn[N(SO_2CF_3)_2]_2$, and 148 mg Irganox™ 1010 antioxidant were combined in 4.43 g tetrahydrofuran. The catalyst mixture was added to 21.942 g of the norbornene mixture in a polymeric bag (94% polyethylene/6% poly(vinyl acetate)) sized to contain the reaction mixture. The bag was then heat sealed.

The packaged reaction mixture was kneaded by hand at ambient temperature for 1 to 2 minutes before being allowed to sit at ambient temperature for an additional 7 minutes. Thereafter, the package was heated at 80° C. for 8 minutes at which time the contents had the appearance of a rubbery solid.

After being cooled, the package was cut in half, and one of the halves was again halved to give two roughly equivalent quarter portions. One of the quarter portions was heated to 175° C. for about 5 minutes with intermittent stirring with a metal blade. During this time, the polymeric bag melted and mixed with the poly(5-hexyl-2-norbornene). This portion was then cooled. The other quarter portion was squeezed from the package and heated to 175° C. for about 5 minutes with intermittent stirring with a metal blade before being cooled. Both of the quarter portions retained their tackiness at room temperature.

Example 6

The process of Example 2 was followed except that only 100 mL of 1-octene and 10 mL of the LYNX™ 900 catalyst (containing 21.99 mg TiCl$_3$) were added to the bag and that the mixture was allowed to polymerize in the water bath for only 30 minutes before being removed.

At this point, the contents of the bag were expelled by applying pressure to the sides of the bag. The polymer was quenched with methanol and then dried under vacuum to yield 14 g (19.5% conversion) poly(1-octene).

A second sample was similarly prepared except that this mixture was allowed to polymerize in the water bath for 60 minutes. Yield was 18.5 g (25.8% conversion).

Various modifications and alterations that do not depart from the scope and spirit of this invention will become apparent to those skilled in the art. This invention is not to be unduly limited to the illustrative embodiments set forth herein.

We claim:

1. A method of making a packaged poly(olefin) comprising the steps:
    a) substantially completely surrounding with a packaging material a mixture comprising
        1) at least one olefinic monomer, having 5 to 30 carbon atoms, having one of the formulae:

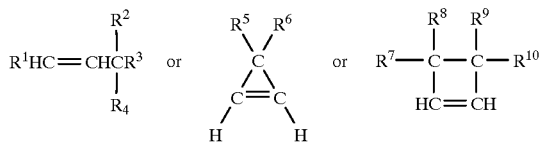

wherein
            $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, or
            $R^1$ and at least one of $R^2$, $R^3$, and $R^4$, as well as the carbon atoms to which they are attached, form at least one strained aliphatic ring;
            $R^5$, $R^6$, $R^7$, $R^8$, $R^9$, and $R^{10}$ are independently selected from the same group as are $R^2$ through $R^4$, with the provisos that
                a) $R^5$ and $R^6$ cannot both be hydrogen, and
                b) $R^7$, $R^8$, $R^9$, and $R^{10}$ cannot all be hydrogen,
        2) an effective amount of a catalyst system comprising a transition metal-containing species, and
        3) optionally, at least one adjuvant; and
    b) allowing said at least one monomer to polymerize to a poly(olefin), said packaging material optionally being in contact with a heat exchange medium while said at least one monomer is polymerizing, said packaging material providing an environment that is inert toward said catalyst system and wherein a hot melt-coated blend of said packaging material and said poly(olefin) functions substantially the same as or better than a hot melt coating of the poly(olefin) for the same end use application.

2. The method of claim 1 wherein said catalyst system has partially polymerized said at least one monomer prior to said mixture being substantially completely surrounded by said packaging material.

3. The method of claim 1 wherein said packaging material completely surrounds said mixture.

4. The method of claim 1 wherein said packaging material comprises two substantially parallel sheets or an elongated tube.

5. The method of claim 1 wherein said at least one monomer comprises a $C_5$–$C_{30}$ α-olefin.

6. The method of claim 5 wherein said catalyst system is a Ziegler-Natta or metallocene system.

7. The method of claim 1 wherein said at least one monomer comprises a ring-strained non-conjugated cyclic olefin, said mixture optionally further comprising at least one of a cocatalyst selected from the group consisting of Lewis acids, oxidizing agents, silanes, heteroatom-containing olefins, and alkylenes, or an antioxidant.

8. The method of claim 7 wherein said catalyst comprises a compound comprising at least one of Mo, W, Ru, Os, Ti, Re, and Ir.

9. The method of claim 1 wherein said packaging material is a flexible thermoplastic polymeric film, said thermoplastic polymer optionally being selected from the group consisting of
    a) homo- and copolymers of propylene and ethylene, and
    b) polyesters and polyester copolymers.

10. The method of claim 1 wherein said packaging material comprises from about 0.5 to 20% of the total weight of said packaging material and said mixture.

11. The method of claim 1 wherein said at least one olefinic monomer is flowable at a temperature between about 15° C. and about 150° C.

12. The method of claim 11 wherein said at least one olefinic monomer is flowable at a temperature between about 20° C. and about 70° C.

13. The method of claim 1 wherein said at least one monomer is a solid monomer.

14. The method of claim 1 wherein said at least one monomer comprises a $C_6$–$C_{12}$ α-olefin.

15. The method of claim 1 wherein said at least one monomer comprises a $C_{12}$–$C_{20}$ α-olefin.

16. The method of claim 1 wherein said at least one monomer is a blend of one or more $C_5$–$C_{30}$ α-olefins and one or more $C_2$–$C_4$-α-olefins.

17. The method of claim 1 wherein said packaging material comprises a polymer made from one or more components of the poly(olefin).

18. The method of claim 1 wherein said packaging material comprises a polymer that is physically and chemically compatible with the poly(olefin) upon melting.

19. The method of claim 9 wherein said packaging material comprises a flexible thermoplastic polymeric film having a melting point of 170° C. or less.

20. The method of claim 1 further comprising the step of:
    (c) introducing the poly(olefin) and packaging material into a vessel in which the packaging material and the poly(olefin) are softened or melted.

21. A method of making a hot-melt coatable packaged poly(olefin) comprising the steps:
    a) substantially completely surrounding with a packaging material a mixture comprising
        1) at least one olefinic monomer, having 5 to 30 carbon atoms, having the formulae:

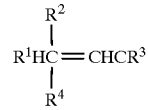

wherein
            $R^1$ is hydrogen and $R^2$, $R^3$, and $R^4$ are independently hydrogen or a $C_1$–$C_{27}$ aryl, aralkyl, aliphatic, or cycloaliphatic group with the provisos that at least one of $R^2$, $R^3$, and $R^4$ must be hydrogen and that $R^2$, $R^3$, and $R^4$ cannot all be hydrogen, 2) an effective amount of a Ziegler-Natta catalyst system comprising a transition metal-containing species, and
3) optionally, at least one adjuvant; and b) allowing said at least one monomer to polymerize to a poly(olefin), said packaging material optionally being in contact with a heat exchange medium while said at least one monomer is polymerizing, said packaging material providing an environment that is inert toward said catalyst system and wherein a hot melt-coated blend of said packaging material and said poly(olefin) functions substantially the same as or better than a hot melt coating of the poly(olefin) for the same end use application.

\* \* \* \* \*

UNITED STATES PATENT AND TRADEMARK OFFICE
CERTIFICATE OF CORRECTION

PATENT NO.: 5,902,654
DATED: May 11, 1999
INVENTOR(S): Robert S. Davidson, Brook F. Duerr, Allen R. Siedle, Katherine A. Brown, and Carig E. Hamer It is certified that error appears in the above-identified patent and that said Letters Patent is hereby corrected as shown below:

Column 14, lines 56-60 " 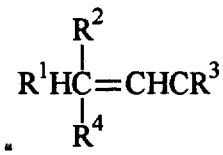 " should be -- 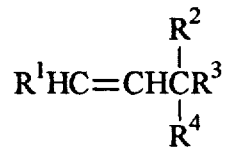 --.

Signed and Sealed this

Fourth Day of January, 2000

Attest:

Attesting Officer

*Acting Commissioner of Patents and Trademarks*

UNITED STATES PATENT AND TRADEMARK OFFICE
CERTIFICATE OF CORRECTION

PATENT NO.: 5,902,654

DATED: May 11, 1999

INVENTOR(S): Robert S. Davidson, Brook F. Duerr, Allen R. Siedle, Katherine A. Brown, and Carig E. Hamer It is certified that error appears in the above-identified patent and that said Letters Patent is hereby corrected as shown below:

Title page, column 1, under "[75] Inventors", "all of Mich." should read --all of Minn.--

Signed and Sealed this

Fifteenth Day of February, 2000

*Attest:*

Q. TODD DICKINSON

*Attesting Officer*  *Commissioner of Patents and Trademarks*